(12) United States Patent
Iwamoto et al.

(10) Patent No.: US 9,630,764 B2
(45) Date of Patent: Apr. 25, 2017

(54) OXYGEN-ABSORBING RESIN COMPOSITION

(71) Applicant: MITSUBISHI GAS CHEMICAL COMPANY, INC., Tokyo (JP)

(72) Inventors: Shinpei Iwamoto, Kanagawa (JP); Satoshi Okada, Kanagawa (JP); Shinichi Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 171 days.

(21) Appl. No.: 14/412,809

(22) PCT Filed: Jul. 9, 2013

(86) PCT No.: PCT/JP2013/068773
§ 371 (c)(1),
(2) Date: Jan. 5, 2015

(87) PCT Pub. No.: WO2014/010598
PCT Pub. Date: Jan. 16, 2014

(65) Prior Publication Data
US 2015/0144838 A1  May 28, 2015

(30) Foreign Application Priority Data
Jul. 10, 2012 (JP) .................................. 2012-154704

(51) Int. Cl.
| B65D 81/26 | (2006.01) |
| A23L 3/3436 | (2006.01) |
| C08K 5/09 | (2006.01) |
| C08F 8/00 | (2006.01) |

(52) U.S. Cl.
CPC .......... B65D 81/266 (2013.01); A23L 3/3436 (2013.01); C08F 8/00 (2013.01); C08K 5/09 (2013.01)

(58) Field of Classification Search
CPC ....... B65D 81/266; A23L 3/3436; C08K 5/09; C08F 8/00
See application file for complete search history.

(56) References Cited

U.S. PATENT DOCUMENTS

| 3,935,141 A | 1/1976 | Potts et al. |
| 5,180,741 A * | 1/1993 | Babin ................... A01N 53/00 514/460 |
| 5,346,644 A | 9/1994 | Speer et al. |
| 5,350,622 A | 9/1994 | Speer et al. |
| 5,529,833 A | 6/1996 | Speer et al. |
| 5,700,554 A | 12/1997 | Speer et al. |
| 6,063,503 A | 5/2000 | Hatakeyama et al. |
| 6,599,598 B1 | 7/2003 | Tai et al. |
| 7,056,565 B1 * | 6/2006 | Cai ........................ B32B 27/18 428/36.7 |
| 2003/0018114 A1 | 1/2003 | Tai et al. |
| 2003/0157283 A1 | 8/2003 | Tai et al. |
| 2010/0227274 A1 | 9/2010 | Hatakeyama et al. |

FOREIGN PATENT DOCUMENTS

| CN | 1515608 | 7/2004 |
| EP | 0 830 386 | 6/2008 |
| JP | 51-136845 | 11/1976 |
| JP | 04-298232 | 10/1992 |
| JP | 5-115776 | 5/1993 |
| JP | 9-234832 | 9/1997 |
| JP | 2001-106886 | 4/2001 |
| JP | 2007-137975 | 6/2001 |
| JP | 2001-252560 | 9/2001 |
| JP | 2002-146217 | 5/2002 |
| JP | 2010-013638 | 1/2010 |
| JP | 2001-106866 | 4/2011 |
| JP | 2011-136552 | 7/2011 |
| JP | 2011-152788 | 8/2011 |
| WO | 99/48963 | 9/1999 |

OTHER PUBLICATIONS

"Kagaku Daijiten 1Shukusatsuban, reduced-size edition 39th print", Kyoritsu Shuppan Co., Ltd., Jun. 15, 2006, pp. 738.
International Search Report in PCT/JP2013/068773 issued Aug. 6, 2013.
International Preliminary Examination Report in PCT/JP2013/068773 issued Jan. 13, 2015.

* cited by examiner

*Primary Examiner* — Peter F Godenschwager
*Assistant Examiner* — Andrew J Oyer
(74) *Attorney, Agent, or Firm* — Greenblum & Bernstein, P.L.C.

(57) ABSTRACT

An oxygen-absorbing resin composition copolymerized polyolefin compound including a copolymerized polyolefin compound and a transition metal catalyst, wherein the copolymerized polyolefin compound is a copolymerized polyolefin compound including at least one of constitutional unit (a) selected from the group consisting of the constitutional units represented by the general formula (1), and at least one of the constitutional unit (b) having an indane ring, selected from the group consisting of the constitutional units represented by the general formulas (2) and (3).

5 Claims, No Drawings

OXYGEN-ABSORBING RESIN COMPOSITION

TECHNICAL FIELD

The present invention relates to an oxygen-absorbing resin composition including a copolymerized polyolefin compound having an indane ring(s) and a transition metal catalyst.

BACKGROUND ART

For the purpose of preventing oxygen oxidation and performing long-term storing of various goods tending to be affected by oxygen and accordingly deteriorated or degraded, typified by food, beverages, pharmaceuticals and cosmetics, there have been used oxygen absorbing agents performing removal of oxygen in the vessels containing these goods.

As oxygen absorbing agents, from the viewpoint of the oxygen absorbing capacity, easiness in handling and safety, there have generally been used oxygen absorbing agents including iron powder as the main reaction agent. However, such iron-based oxygen absorbing agents responds to metal detectors, and hence it has been difficult to use metal detectors for foreign matter inspection. Packages enclosing iron-based oxygen absorbing agents have possibility of ignition and hence cannot be heated with microwave ovens. In addition, the oxidation reaction of iron powder needs moisture, and hence iron-based oxygen absorbing agents have been able to develop the oxygen absorption effect thereof only for the objects to be stored which are high-moisture systems.

By constituting vessels and the like with multilayer materials having oxygen absorbing layers composed of oxygen absorbing resin compositions prepared by mixing iron-based oxygen absorbing agents with thermoplastic resins, packaging vessels and the like have been developed in such a way that the gas barrier property of the vessels and the like is achieved and the oxygen absorbability is imparted to the vessels themselves (see Patent Literature 1). Specifically, an oxygen absorbing multilayer film includes, as the case may be, additionally an oxygen absorbing layer which is a thermoplastic resin layer including an oxygen absorbing agent as dispersed therein, through an intermediate layer formed of a thermoplastic resin, between conventional gas barrier multilayer films each including a heat seal layer and a gas barrier layer as laminated on each other; such an oxygen absorbing multilayer film is used as a film to which a function to absorb oxygen inside a vessel in addition to the function to prevent the permeation of oxygen from outside, and produced by heretofore known production methods such as extrusion lamination, coextrusion lamination and dry lamination. However, such vessels also have a problem such that such vessels are detected by metal detectors used for foreign matter inspection for food and the like, cannot be heated with microwave ovens, and can develop the effect thereof only for the objects to be stored which are high-moisture systems. An oxygen absorbing multilayer film using an oxygen absorbing agent such as iron powder suffers from problems such that such an oxygen absorbing multilayer film is detected by a metal detector used for foreign matter inspection for food and the like, is insufficient in internal visibility due to opacity, and induces flavor degradation of the content because of the generation of aldehyde from the oxidation reaction of alcohol with iron as a catalyst when the content is an alcoholic beverage.

From the aforementioned circumstances, oxygen absorbing agents including an organic substance as a main reaction agent are demanded. As the oxygen absorbing agent including an organic substance as a main reaction agent, an oxygen absorbing agent including ascorbic acid as the main agent is known (see Patent Literature 2).

On the other hand, an oxygen absorbing resin composition being composed of a resin and a transition metal catalyst and having an oxygen-capturing property is known. For example, a resin composition is known which is composed of a polyamide, in particular a xylylene group-containing polyamide as an oxidizable organic component and a transition metal catalyst (see, Patent Literature 3). Additionally, Patent Literature 3 discloses as examples, for example, packaging materials obtained by molding resin compositions.

As an oxygen absorbing resin composition requiring no moisture for oxygen absorption, an oxygen absorbing resin composition composed of a resin having carbon-carbon unsaturated bonds and a transition metal catalyst is also known (see Patent Literature 4).

CITATION LIST

Patent Literature

Patent Literature 1: Japanese Patent Laid-Open No. H9-234832
Patent Literature 2: Japanese Patent Laid-Open No. S51-136845
Patent Literature 3: Japanese Patent Laid-Open No. 2001-252560
Patent Literature 4: Japanese Patent Laid-Open No. H05-115776

SUMMARY OF INVENTION

Technical Problem

However, the oxygen absorbing agent of Patent Literature 2 has a problem such that the oxygen absorbing agent composition is in the first place low in oxygen absorption performance, develops the effect only for an object to be stored which is a high-moisture system, and is comparatively expensive.

The resin composition of Patent Literature 3 develops the oxygen absorption function through the oxidation of the xylylene group-containing polyamide resin by including the transition metal catalyst, and accordingly suffers from a problem such that after absorption of oxygen, the oxidation degradation of the resin causes the breakage of the polymer chains to degrade the strength of the packaging vessel itself. In addition, the resin composition has a problem to be solved such that the oxygen absorption performance thereof is still insufficient, and the resin composition develops the effect thereof only for objects to be stored which are high-moisture systems.

The oxygen absorbing resin composition of Patent Literature 4 also suffers from a problem such that the breakage of the polymer chain caused by the oxidation of the resin produces, similarly to the foregoing description, low molecular weight organic compounds to be odor components to result in generation of the odor after the absorption of oxygen.

The present invention has been achieved in view of the aforementioned circumstances, and takes as its object the provision of an oxygen-absorbing resin composition being free from the generation of the odor after the absorption of oxygen and having an excellent oxygen absorption performance. Another object of the present invention is the provision of an oxygen-absorbing resin composition developing an excellent oxygen absorption performance over a wide range of humidity conditions from a low humidity to a high humidity.

Solution to Problem

The present inventors made a diligent study, and consequently have perfected the present invention by discovering that an oxygen-absorbing resin composition including at least one of the copolymerized polyolefin compound having an indane ring(s) and a transition metal catalyst can solve the foregoing problems.

Specifically, the present invention is as follows.

[1]

An oxygen-absorbing resin composition including a copolymerized polyolefin compound and a transition metal catalyst, wherein the copolymerized polyolefin compound is a copolymerized polyolefin compound comprising:

at least one of constitutional unit (a) selected from the group consisting of the constitutional units represented by the following general formula (1):

[Formula 1]

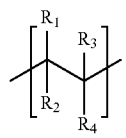

(1)

(wherein $R_1$, $R_2$, $R_3$ and $R_4$ each independently represent a hydrogen atom or a first monovalent substituent, the first monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group, and these groups may further have a substituent); and at least one of constitutional unit (b) having an indane ring, selected from the group consisting of the constitutional units represented by the following general formulas (2) and (3):

[Formula 2]

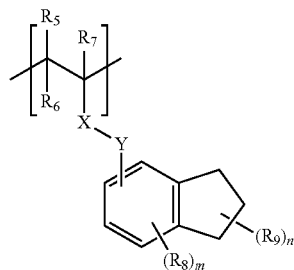

(2)

-continued

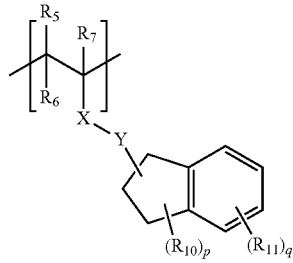

(3)

(wherein $R_5$, $R_6$ and $R_7$ each independently represent a hydrogen atom or a second monovalent substituent, $R_8$, $R_9$, $R_{10}$ and $R_{11}$ each independently represent a third monovalent substituent, the second monovalent substituent and the third monovalent substituent are each independently at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group, the groups may further have a substituent, and when the number of $R_8$s, $R_9$s, $R_{10}$s or $R_{11}$s being present is two or more, the two or more $R_8$s, $R_9$s, $R_{10}$s or $R_{11}$s may be the same as each other or different from each other; m represents an integer of 0 to 3, n represents an integer of 0 to 5, p represents an integer of 0 to 4 and q represent an integer of 0 to 4, and at least one hydrogen atom is bonded to a benzylic position of the indane ring; X represents a divalent group selected from the group consisting of —(C=O)O—, —(C=O)NH—, —O(C=O)—, —NH(C=O)— and —(CHR)s-, and s represents an integer of 0 to 12; Y is —(CHR)t-, and t represents an integer of 0 to 12; and R represents a monovalent chemical species selected from the group consisting of a hydrogen atom, a methyl group and an ethyl group).

[2]

The oxygen-absorbing resin composition according to [1], wherein the transition metal catalyst include at least one transition metal selected from the group consisting of manganese, iron, cobalt, nickel and copper.

[3]

The oxygen-absorbing resin composition according to [1] or [2], wherein the transition metal catalyst is included in an amount of 0.001 to 10 parts by mass in terms of the transition metal amount, based on 100 parts by mass of the copolymerized polyolefin compound.

[4]

The oxygen-absorbing resin composition according to any one of [1] to [3], wherein a content ratio of a content of the constitutional unit (a) to a content of the constitutional unit (b) is 1/99 to 99/1 in terms of the molar ratio.

[5]

The oxygen-absorbing resin composition according to any one of [1] to [4], wherein the constitutional unit (a) is at least one selected from the group consisting of the constitutional units represented by the following general formulas (4) and (5):

[Formula 3]

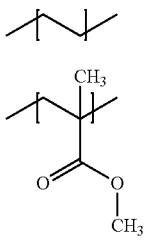

(4)

(5)

and the constitutional unit (b) is the constitutional unit represented by the following general formula (6):

[Formula 4]

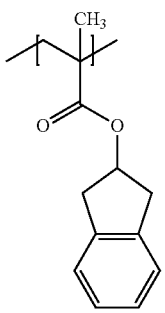

(6)

Advantageous Effects of Invention

According to the present invention, it is possible to provide an oxygen-absorbing resin composition being free from the generation of the odor after the absorption of oxygen and having an excellent oxygen absorption performance. It is also possible to provide an oxygen-absorbing resin composition developing an excellent oxygen absorption performance over a wide range of humidity conditions from a low humidity to a high humidity. Moreover, the oxygen-absorbing resin composition of the present invention does not suffer from the breakage of the molecular chain of the copolymerized polyolefin compound, due to oxidation even after oxygen absorption, so as to maintain the structure of the composition, and hence maintains the exterior appearance thereof satisfactorily and can suppress the degradation of the strength thereof.

DESCRIPTION OF EMBODIMENT

Hereinafter, an embodiment for implementing the present invention (hereinafter, simply referred to as "the present embodiment") is described in detail. The present embodiment is presented as exemplification for describing the present invention, and the present invention is not intended to be limited to the following contents. The present invention can be implemented as appropriately modified within the scope of the gist thereof.

[Oxygen-Absorbing Resin Composition]

The oxygen-absorbing resin composition of the present embodiment includes at least: a copolymerized polyolefin compound (hereinafter, also simply referred to as "the indane ring-containing copolymerized polyolefin compound") including the constitutional unit (a) which is at least one of ethylene or substituted ethylene constitutional unit selected from the group consisting of the constitutional units represented by the general formula (1) and the constitutional unit (b) which is at least one of the substituted ethylene constitutional unit having an indane ring, selected from the group consisting of the constitutional units represented by the general formula (2) or (3); and a transition metal catalyst.

<Indane Ring-Containing Copolymerized Polyolefin Compound>

The indane ring-containing copolymerized polyolefin compound of the present embodiment includes the constitutional unit (a) which is at least one of ethylene or substituted ethylene constitutional unit selected from the group consisting of the constitutional units represented by the general formula (1) and the constitutional unit (b) which is at least one of the substituted ethylene constitutional unit having an indane ring, selected from the group consisting of the constitutional units represented by the general formula (2) or (3).

The constitutional unit (a) represented by the general formula (1) is preferably at least one selected from the group consisting of the constitutional units represented by the formulas (4) and (5), and the constitutional unit (b) is preferably the constitutional unit represented by the formula (6). Here, the statement that a compound "includes a constitutional unit" means that the compound includes one or more of the constitutional units concerned. Such a constitutional unit is preferably included as a repeating unit in the indane ring-containing copolymerized polyolefin compound. The indane ring-containing copolymerized polyolefin compound may be either of a random copolymer of the constitutional unit (a) and the constitutional unit (b) and a block copolymer of the constitutional unit (a) and the constitutional unit (b). Alternatively, the form of the copolymerization of these constitutional units may be, for example, an alternating copolymerization or a graft copolymerization.

The indane ring-containing copolymerized polyolefin compound may include other constitutional units other than the constitutional unit (a) and the constitutional unit (b), and may either of a random copolymer of the constitutional unit (a), the constitutional unit (b) and the other constitutional unit(s) and a block copolymer of the constitutional unit (a), the constitutional unit (b) and the other constitutional unit(s). Alternatively, the form of the copolymerization of these constitutional units may be, for example, an alternating copolymerization or a graft copolymerization.

In the constitutional units represented by the general formulas (1) to (3), examples of the monovalent substituents (the first monovalent substituent, the second monovalent substituent and the third monovalent substituent) represented by $R_1$, $R_2$, $R_3$, $R_4$, $R_5$, $R_6$, $R_7$, $R_8$, $R_9$, $R_{10}$ and $R_{11}$ (denoted as "$R_1$ to $R_{11}$," the same applies hereinafter) include, without being particularly limited to: halogen atoms (such as a chlorine atom, a bromine atom and an iodine atom), alkyl groups (linear, branched or cyclic alkyl groups having preferably 1 to 15 carbon atoms, more preferably 1 to 6 carbon atoms, such as a methyl group, an ethyl group, an n-propyl group, an isopropyl group, a t-butyl group, an n-octyl group, a 2-ethylhexyl group, a cyclopropyl group and a cyclopentyl group), alkenyl groups (linear, branched or cyclic alkenyl groups preferably having 2 to 10 carbon atoms, more preferably 2 to 6 carbon atoms, such as a vinyl group and an allyl group), alkynyl groups (alkynyl groups having preferably 2 to 10 carbon atoms, more preferably 2 to 6 carbon atoms, such as an ethynyl group and a propargyl group), aryl groups (aryl groups having preferably 6 to 16 carbon atoms, more preferably 6 to 10 carbon atoms, such as a phenyl group and a naphthyl group), heterocyclic groups (monovalent groups obtained by eliminating one hydrogen atom from 5-membered ring or 6-membered ring aromatic or non-aromatic heterocyclic compounds having preferably 1 to 12 carbon atoms, more preferably 2 to 6 carbon atoms, such as a 1-pyrazolyl group, a 1-imidazolyl group and a 2-furyl group), a cyano group, a hydroxy group, a carboxyl group, ester groups, amide groups, a nitro group, alkoxy groups (linear, branched or cyclic alkoxy groups having preferably 1 to 10 carbon atoms, more preferably 1 to 6 carbon atoms, such as a methoxy group and an ethoxy group), aryloxy groups (aryloxy groups having preferably 6 to 12 carbon atoms, more preferably 6 to 8 carbon atoms, such as a phenoxy group), acyl groups (inclusive of a formyl group, alkyl carbonyl groups having preferably 2 to 10 carbon atoms, more preferably having 2 to 6 carbon atoms, and aryl carbonyl groups having preferably 7 to 12 carbon atoms, more preferably 7 to 9 carbon atoms, such as an acetyl group, a pivaloyl group and a benzoyl group), amino groups (alkyl amino groups having preferably 1 to 10 carbon atoms, more preferably 1 to 6 carbon atoms, anilino groups having preferably 6 to 12 carbon atoms, more preferably 6 to 8 carbon atoms, and heterocyclic amino groups having preferably 1 to 12 carbon atoms, more preferably 2 to 6 carbon atoms, such as an amino group, a methyl amino group and an anilino group), mercapto groups, alkylthio groups (alkylthio groups having preferably 1 to 10 carbon atoms, more preferably 1 to 6 carbon atoms, such as a methylthio group and an ethylthio group), arylthio groups (arylthio groups having preferably 6 to 12 carbon atoms, more preferably 6 to 8 carbon atoms, such as a phenylthio group), heterocyclic thio groups (heterocyclic thio groups having preferably 2 to 10 carbon atoms, more preferably 1 to 6 carbon atoms, such as a 2-benzothiazolylthio group), and imide groups (imide groups having preferably 2 to 10 carbon atoms, more preferably 4 to 8 carbon atoms, such as an N-succinimide group and an N-phthalimide group).

When the monovalent substituents $R_1$ to $R_{11}$ have a hydrogen atom(s), the hydrogen atom(s) may further be substituted with a substituent T (here, the substituent T is defined in the same manner as in the foregoing description of the monovalent substituents $R_1$ to $R_{11}$). Specific examples of such groups include, without being particularly limited to: alkyl groups substituted with a hydroxy group (such as a hydroxyethyl group), alkyl groups substituted with an alkoxy group (such as a methoxy ethyl group), alkyl groups substituted with an aryl group (such as a benzyl group), alkyl groups substituted with a primary or secondary amino group (such as an amino ethyl group), aryl groups substituted with an alkyl group (such as a p-tolyl group), and aryloxy groups substituted with an alkyl group (such as a 2-methyl phenoxy group). When the monovalent substituents $R_1$ to $R_{11}$ have a monovalent substituent T, the foregoing number of carbon atoms does not include the number of carbon atoms of the substituent T. For example, a benzyl group is regarded as an alkyl group having one carbon atom, substituted with a phenyl group, but not as an alkyl group having 7 carbon atoms. When the monovalent substituents $R_1$ to $R_{11}$ have the substituent(s) T, the number of the substituents T may be two or more.

In the constitutional unit represented by the general formula (2) or (3), X represents a divalent group selected from the group consisting of —(C=O)O—, —(C=O)NH—, —O(C=O)—, —NH(C=O)— and —(CHR)s-, and s represents an integer of 0 to 12; Y is —(CHR)t-, and t represents an integer of 0 to 12; and R represents a monovalent chemical species selected from the group consisting of a hydrogen atom (—H), a methyl group (—CH$_3$) and an ethyl group (—C$_2$H$_5$).

The indane ring-containing copolymerized polyolefin compound of the present embodiment is obtained by copolymerizing an indane ring-containing vinyl compound (I) and another vinyl compound (II).

Examples of the indane ring-containing compound (I) used in the present embodiment include the vinyl compounds selected from the group consisting of the compounds represented by the following general formula (7) or (8): The indane ring-containing compounds (I) can be used each alone or in combinations of two or more thereof.

[Formula 5]

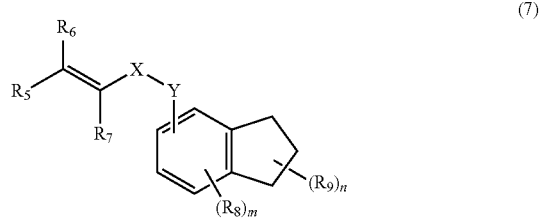

(7)

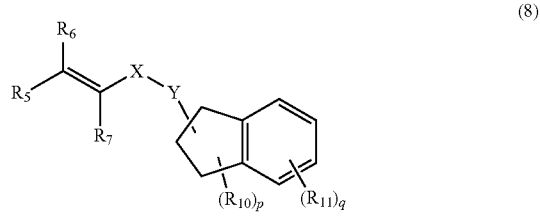

(8)

(wherein $R_5$ to $R_7$ each independently represent a hydrogen atom or the second monovalent substituent, $R_8$ to $R_{11}$ each independently represent the third monovalent substituent, the second monovalent substituent and the third monovalent substituent are each independently at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group; these groups may further have a substituent(s) (corresponding to the foregoing substituent T); and when the number of $R_8$s, $R_9$s, $R_{10}$s or $R_{11}$s being present is two or more, the two or more $R_8$s, $R_9$s, $R_{10}$s or $R_{11}$s may be the same as each other or different from each other; m represents an integer of 0 to 3, n represents an integer of 0 to 5, p represents an integer of 0 to 4 and q represent an integer of 0 to 4, and at least one hydrogen atom is bonded to the benzylic position(s) of the indane ring; X represents a divalent group selected from the group consisting of —(C=O)O—, —(C=O)NH—, —O(C=O)—, —NH(C=O)— and —(CHR)s-, and s represents an integer of 0 to 12; Y is —(CHR)t-, and t represents an integer of 0 to 12; and R represents a monovalent chemical species selected from the group consisting of —H, —CH$_3$ and an —C$_2$H$_5$.)

Examples of the vinyl compound (II) used in the present embodiment include the vinyl compounds selected from the group consisting of the compounds represented by the following general formula (9). The vinyl compounds (II) can be used each alone or in combinations of two or more thereof.

[Formula 6]

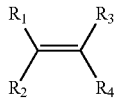

(9)

(wherein $R_1$ to $R_4$ each independently represent a hydrogen atom or the first monovalent substituent, the first monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group; and these groups may further have a substituent(s) (corresponding to the foregoing substituent T).)

Examples of the vinyl compound represented by the general formula (9) include: ethylene or α-olefins having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicocene; cycloolefins such as cyclobutene, cyclopentene, cyclohexene, 3,4-dimethylcyclopentene, 3-methylcyclohexene, 2-(2-methyl butyl)-1-cyclohexene and cyclooctene; non-conjugated dienes such as 1,4-hexadiene, 4-methyl-1,4-hexadiene, 5-methyl-1,4-hexadiene and 1,7-octadiene; conjugated dienes such as butadiene, isoprene, 2,3-dimethylbutadiene, pentadiene and hexadiene; styrenes such as styrene, α-methylstyrene, 2-methylstyrene, 4-methylstyrene, 4-propylstyrene, 4-tert-butylstyrene, 4-cyclohexylstyrene, 4-dodecylstyrene, 2-ethyl-4-benzylstyrene and 2,4,6-trimethylstyrene; methyl (meth)acrylate, ethyl (meth) acrylate, n-propyl (meth)acrylate, i-propyl (meth)acrylate, n-butyl (meth)acrylate, i-butyl (meth)acrylate, sec-butyl (meth)acrylate, t-butyl (meth)acrylate, n-amyl (meth)acrylate, i-amyl (meth)acrylate, (meth)acrylic acid, crotonic acid, cinnamic acid, maleic acid, fumaric acid, itaconic acid, monomethyl maleate, monoethyl maleate, hydroxy methyl (meth)acrylate, 2-hydroxyethyl (meth)acrylate, 2-hydroxypropyl (meth)acrylate, 3-hydroxypropyl (meth)acrylate, 2-dimethylaminoethyl (meth)acrylate, 2-diethylaminoethyl (meth)acrylate, 2-dimethylaminopropyl (meth)acrylate, (meth)acrylonitrile, α-chloroacrylonitrile, ethacrylonitrile, 2-cyanoethyl (meth)acrylate, 2-cyanopropyl (meth)acrylate, (meth)acrylamide, α-chloro(meth)acrylamide, ethacrylamide, N-methyl(meth)acrylamide, N-vinyl-ε-caprolactam, N-vinylpyrrolidone, 2-nitroethyl (meth)acrylate and 3-nitropropyl (meth)acrylate. These can be used each alone or in combinations of two or more thereof. Here, a (meth)acrylate means an acrylate and the methacrylate corresponding to the acrylate, and a (meth)acrylic acid means an acrylic acid and the methacrylic acid corresponding to the acrylic acid.

The indane ring-containing copolymerized polyolefin compound of the present embodiment can also be obtained by allowing to react with hydrogen the copolymerized polyolefin compound which contains the constitutional unit (a) and at least one substituted ethylene constitutional unit (c) which contains a substituent having an indane ring, selected from the group consisting of the constitutional units represented by the following general formula (10) or (11).

[Formula 7]

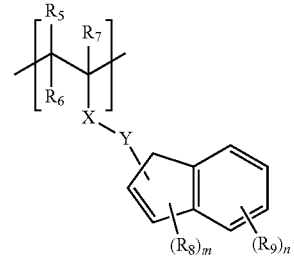

(10)

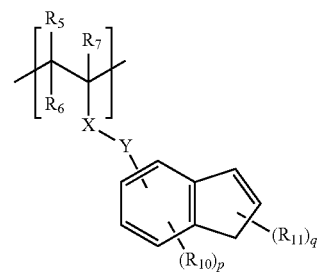

(11)

(wherein $R_5$ to $R_7$ each independently represent a hydrogen atom or the second monovalent substituent, $R_8$, $R_9$, $R_{10}$ and $R_{11}$ each independently represent the third monovalent substituent, the second monovalent substituent and the third monovalent substituent are each independently at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group; these groups may further have a substituent(s) (corresponding to the foregoing substituent T); and when the number of $R_8$s, $R_9$s, $R_{10s}$ or $R_{11s}$ being present is two or more, the two or more $R_8$s, $R_9$s, $R_{10}$s or $R_{11}$s may be the same as each other or different from each other; m represents an integer of 0 to 3, n represents an integer of 0 to 4, p represents an integer of 0 to 3 and q represent an integer of 0 to 4; X represents a divalent group selected from the group consisting of —(C=O)O—, —(C=O)NH—, —O(C=O)—, —NH(C=O)— and —(CHR)s-, and s represents an integer of 0 to 12; Y is —(CHR)t-, and t represents an integer of 0 to 12; and R represents a monovalent chemical species selected from the group consisting of —H, —CH$_3$ and an —C$_2$H$_5$.)

Examples of yet another production method of the indane ring-containing copolymerized polyolefin compound of the present embodiment include a method in which a polyolefin (III) having a reactive functional group(s) in the side chain(s) thereof and a compound (IV) having an indane ring are allowed to react with each other.

Examples of the polyolefin (III) having a reactive functional group(s) in the side chain(s) thereof include: unsaturated carboxylic acid polymers such as poly(meth)acrylic acid; unsaturated carboxylic acid ester polymers such as polymethyl methacrylate; polyvinyl acetate derivatives such as polyvinyl alcohol and polyvinyl acetate; ethylene-unsaturated carboxylic acid copolymers; ethylene-unsaturated carboxylic acid ester copolymers; ethylene-vinyl alcohol copolymer; and maleic anhydride-modified polyolefins such as maleic anhydride-modified poly ethylene and maleic anhydride-modified polypropylene. These can be used each alone or in combinations of two or more thereof.

As the compound (IV) having an indane ring, a compound is preferable which has a functional group to be easily bonded to the polyolefin (III) having a reactive functional group(s) in the side chain(s) thereof; examples of such a compound may include: an alcohol compound, an amine compound, a carboxylic acid compound, an acid anhydride compound and an epoxide compound, each having an indane ring. These can be used each alone or in combinations of two or more thereof.

In particular, a method is preferable in which an alcohol compound having an indane ring as the compound (IV) having an indane ring and a transesterification catalyst are added in a solution obtained by dissolving in an organic solvent a polyolefin having an ester group(s) in the side chain(s) thereof as the polyolefin (III) having a reactive functional group(s) in the side chain(s) thereof, and thus the indane ring-containing copolymerized polyolefin compound is produced by transesterification reaction.

The transesterification reaction can be performed according to a heretofore known method. The reaction temperature and the reaction time are not particularly limited, as long as the reaction temperature and the reaction time fall within the range allowing the transesterification reaction to be performed; however, the reaction temperature is preferably 50 to 300° C. and the reaction time is preferably 10 minutes to 24 hours. As the organic solvent to be used for the transesterification reaction, any organic solvent that can dissolve the resulting polymer can be used without being particularly limited. Examples of such an organic solvent include benzene, toluene, xylene and decaline.

Examples of another transesterification reaction method include a method in which a polyolefin having an ester group(s) in the side chain(s) thereof as the polyolefin (III) having a reactive functional group(s) in the side chain(s) thereof, an alcohol compound having an indane ring as the compound (IV) having an indane ring, and a transesterification catalyst are melt-kneaded with, for example, a single screw extruder, a twin screw extruder, or a kneader.

As the transesterification catalyst used for the transesterification reaction, heretofore known substances can be used; examples of such substances include: sodium tert-butoxide, sodium propoxide, sodium ethoxide, sodium hydroxide, tetraisopropyl titanate, tetrabutyl titanate, titanium oxide, titanium chloride, zirconium chloride, hafnium chloride, tin chloride, and metallocene complex catalysts of titanium, zirconium and tin. These can be used each alone or in combinations of two or more thereof.

The ratio ((a)/(b)) of the content of the constitutional unit (a) to the content of the constitutional unit (b), contained in the indane ring-containing copolymerized polyolefin compound of the present embodiment, is preferably set at 1/99 to 99/1, more preferably set at 1/19 to 19/1 and particularly set at 1/9 to 9/1, in terms of molar ratio. When the (a)/(b) falls within the foregoing ranges, for example, the oxygen absorption capability and the moldability of the resin tend to be compatible with each other.

The melt mass-flow rate (hereinafter, denoted as "MFR") of the indane ring-containing copolymerized polyolefin compound of the present embodiment is not particularly limited, but is preferably 0.1 to 500 g/10 min and more preferably 0.2 to 100 g/10 min, at 190° C. from the viewpoint of moldability. In present Description, unless otherwise specified, MFR means a value measured by using an apparatus according to JIS K7210, at a specific temperature, under a load of 2160 g, and is presented in the units of "g/10 min" together with the measurement temperature.

Specific preferable examples of the constitutional unit (a) include the constitutional unit represented by the formula (4) or (5), without being limited to these. When the constitutional unit (a) has the constitutional unit represented by the formula (4) or (5), the raw material compound is available at a low price, and the introduction of the indane ring by transesterification reaction tends to become easy.

Specific preferable examples of the constitutional unit (b) include the constitutional unit represented by the formula (6), without being limited to this. When the constitutional unit (b) has the constitutional unit represented by the formula (6), the raw material compound is available at a low price, the introduction of the indane ring by transesterification reaction tends to become easy, and the oxygen absorption performance tends to become high because the constitutional unit (b) has two hydrogen atoms at the benzylic positions thereof.

The molecular weight of the indane ring-containing copolymerized polyolefin compound can be appropriately set in consideration of the intended performances, handleability and the like, without being particularly limited. In general, the weight average molecular weight (Mw) is preferably $1.0 \times 10^3$ to $8.0 \times 10^5$ and more preferably $5.0 \times 10^3$ to $5.0 \times 10^5$. The number average molecular weight (Mn) is also preferably $1.0 \times 10^3$ to $1.0 \times 10^6$ and more preferably $5.0 \times 10^3$ to $1.0 \times 10^5$. The molecular weights as referred to herein are all the values relative to polystyrene standards. The indane ring-containing copolymerized polyolefin compounds can be used each alone or in combinations of two or more thereof.

The foregoing indane ring-containing copolymerized polyolefin compounds are all the compounds having hydrogen atoms in the benzylic positions of the indane ring, and are used in combination with the below-detailed transition metal catalyst to undergo the abstraction of the hydrogen atoms at the benzylic positions so as to thereby develop an excellent oxygen absorbing capacity.

The oxygen-absorbing resin composition of the present embodiment is remarkably suppressed in the odor generation after the absorption of oxygen. The reason for the suppression is not clear, but the following oxidation reaction mechanism is inferred to be involved. Specifically, it is interpreted that in the indane ring-containing copolymerized polyolefin compound, first the hydrogen atoms located at the benzylic positions of the indane ring are abstracted to produce radicals, and subsequently, the reaction between the radicals and oxygen oxidizes the carbon atoms at the benzylic positions to produce hydroxy groups or ketone groups. Accordingly, it is inferred that the oxygen-absorbing resin composition of the present embodiment does not involve the breakage of the molecule chain of the main oxygen-absorbing agent due to oxidation reaction, as occurring in the conventional technique, thus maintains the structure of the indane ring-containing copolymerized polyolefin compound, and consequently hardly produces, after the absorption of oxygen, a low molecular weight organic compound to be a cause for odor.

<Transition Metal Catalyst>

As the transition metal catalyst used in the oxygen-absorbing resin composition of the present embodiment, a transition metal catalyst appropriately selected from the heretofore known transition metal catalysts can be used, without being particularly limited, as long as the selected transition catalyst can function as the catalyst for the oxidation reaction of the indane ring-containing copolymerized polyolefin compound.

Specific examples of such a transition metal catalyst include organic acid salts, halides, phosphates, phosphites, hypophosphites, nitrates, sulfates, oxides and hydroxides of transition metals. Examples of the transition metal contained in the transition metal catalyst include, without being limited to: titanium, vanadium, chromium, manganese, iron, cobalt, nickel, copper, zinc, ruthenium and rhodium. Among these, manganese, iron, cobalt, nickel and copper are preferable. Examples of the organic acid include, without being limited to: acetic acid, propionic acid, octanoic acid, lauric acid, stearic acid, acetylacetone, dimethyldithio carbamic acid, palmitic acid, 2-ethylhexanoic acid, neodecanoic acid, linoleic acid, tall oil acid, oleic acid, capric acid and naphthenic acid. The transition metal catalyst is preferably the combinations of the foregoing transition metals and the foregoing organic acids; the transition metal such as manganese, iron, cobalt, nickel or copper is more preferable and the transition metal such as manganese, iron or cobalt is furthermore preferable, and the organic acid such as acetic acid, stearic acid, 2-ethylhexanoic acid, oleic acid or naphthenic acid is more preferable and the organic acid such as acetic acid or stearic acid is furthermore preferable; and a combination of any of these transition metals and any of these organic acids is particularly preferable. The transition metal catalysts can be used each alone or in combinations of two or more thereof.

The content of the indane ring-containing copolymerized polyolefin compound and the content of the transition metal catalyst in the oxygen-absorbing resin composition of the present embodiment can be appropriately set, without being particularly limited, according to the types and intended performances of the indane ring-containing copolymerized polyolefin compound used and the transition metal catalyst used. From the viewpoint of the amount of oxygen absorbed of the oxygen-absorbing resin composition, the content of the transition metal catalyst is, in terms of the transition metal amount, preferably 0.001 to 10 parts by mass, more preferably 0.002 to 2 parts by mass, furthermore preferably 0.005 to 1 part by mass, yet furthermore preferably 0.008 to 0.5 part by mass and particularly preferably 0.01 to 0.2 part by mass, based on 100 parts by mass of the indane ring-containing copolymerized polyolefin compound.

The indane ring-containing copolymerized polyolefin compound and the transition metal catalyst can be mixed with each other by a heretofore known method. By kneading these with an extruder, an oxygen-absorbing resin composition having a higher dispersiveness can also be obtained.

<Thermoplastic Resin>

The oxygen-absorbing resin composition of the present embodiment may also include a thermoplastic resin. In this case, the forms of inclusion of the indane ring-containing copolymerized polyolefin compound and the transition metal catalyst in the oxygen-absorbing resin composition are not particularly limited.

The preparation of the oxygen-absorbing resin composition can be performed according to a conventional method, without being particularly limited. For example, the indane ring-containing copolymerized polyolefin compound and the transition metal catalyst are mixed in or kneaded with the thermoplastic resin, and thus the oxygen-absorbing resin composition can be obtained.

As the thermoplastic resin, heretofore known thermoplastic resins can be appropriately used. Examples of the thermoplastic resins include, without being particularly limited to: polyolefins such as low density polyethylene, medium density polyethylene, high density polyethylene, linear low density polyethylene, linear ultra low density polyethylene, polypropylene, poly-1-butene, poly-4-methyl-1-pentene, and random or block copolymers of α-olefins such as ethylene, propylene, 1-butene and 4-methyl-1-pentene; acid-modified polyolefins such as maleic anhydride graft polyethylene and maleic anhydride graft polypropylene; ethylene-vinyl compound copolymers such as ethylene-vinyl acetate copolymer, ethylene-vinyl alcohol copolymer, ethylene-vinyl chloride copolymer, ethylene-(meth)acrylic acid copolymer and ionically cross-linked products (ionomers) thereof, and ethylene-methyl methacrylate copolymer; styrene-based resins such as polystyrene, acrylonitrile-styrene copolymer and α-methyl styrene-styrene copolymer; polyvinyl compounds such as polymethyl acrylate and polymethyl methacrylate; polyamides such as nylon 6, nylon 66, nylon 610, nylon 12 and polymethaxylylene adipamide (MXD6); polyesters such as polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone and polyhydroxyalkanoate; polycarbonate; polyethers such as polyethylene oxide, or mixtures of these. The thermoplastic resins can be used each alone or in combinations of two or more thereof.

Among these, the thermoplastic resin is preferably at least one resin selected from the group consisting of polyolefin, polyester, polyamide, ethylene-vinyl alcohol copolymer, a plant-derived resin and a chlorine-based resin. Moreover, the thermoplastic resin is preferably at least one resin selected from polyolefin, polyester, polyamide, ethylene-vinyl alcohol copolymer and a chlorine-based resin. Hereinafter, these preferable thermoplastic resins are described in detail.

<Polyolefin>

Examples of the polyolefin used in the oxygen-absorbing resin composition of the present embodiment include: polyethylenes such as low density polyethylene, medium density polyethylene, high density polyethylene, linear low density polyethylene and linear ultra-low-density polyethylene; olefin homopolymers such as polypropylene, polybutene-1 and poly-4-methylpentene-1; ethylene-α-olefin copolymers such as ethylene-propylene random copolymer, ethylene-propylene block copolymer, ethylene-propylene-polybutene-1 copolymer and ethylene-cyclic olefin copolymer; other ethylene copolymers such as ethylene-α,β-unsaturated carboxylic acid copolymers such as ethylene-(meth)acrylic acid copolymer, ethylene-α,β-unsaturated carboxylic acid ester copolymers such as ethylene-ethyl (meth)acrylate copolymer, ion cross-linked products of ethylene-α,β-unsaturated carboxylic acid copolymer and ethylene-vinyl acetate copolymer; ring-opening polymers of cyclic olefins and the hydrogenated products thereof; cyclic olefin-ethylene copolymers; and the graft modified polyolefins obtained by graft modifying these polyolefins with, for example, acid anhydrides such as maleic anhydride.

<Polyester>

Examples of the polyester used in the oxygen-absorbing resin composition of the present embodiment include: polyesters obtained from one or two or more selected from polybasic carboxylic acids inclusive of dicarboxylic acids and ester-forming derivatives of these and one or two or more selected from polyhydric alcohols inclusive of glycol; polyesters obtained from hydroxycarboxylic acids and ester-forming derivatives of these; and polyesters obtained from cyclic esters. Ethylene terephthalate-based thermoplastic polyesters are preferably products in which the ethylene terephthalate unit accounts for most of the ester repeating units, and commonly accounts for 70 mol % or more of the ester repeating units, the glass transition point (Tg) falls within a range from 50 to 90° C., and the melting point (Tm) falls within a range from 200 to 275° C. As an ethylene terephthalate-based thermoplastic polyester, polyethylene terephthalate is excellent in pressure resistance, heat resistance, heat and pressure resistance and the like; however, it is also possible to use copolymerized polyesters including, in addition to the ethylene terephthalate unit, a small amount of the ester unit obtained from dicarboxylic acid such as isophthalic acid or naphthalenedicarboxylic acid and a diol such as propylene glycol.

Specific examples of the dicarboxylic acid include: saturated aliphatic dicarboxylic acids exemplified by oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimeric acid, or ester-forming derivatives of these; unsaturated aliphatic dicarboxylic acids exemplified by fumaric acid, maleic acid and itaconic acid, or ester-forming derivatives of these; naphthalene dicarboxylic acids such as orthophthalic acid, isophthalic acid, terephthalic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, aromatic dicarboxylic acids exemplified by 4,4'-biphenyl dicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, and anthracene dicarboxylic acid, or ester-forming derivatives of these; and metal sulfonate group containing aromatic dicarboxylic acids exemplified by 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid, or lower alkyl ester derivatives of these.

Among the above-described dicarboxylic acids, from the viewpoint of the physical properties and others of the obtained polyester, in particular, it is preferable to use terephthalic acid, isophthalic acid, naphthalenedicarboxylic acid and the like. If necessary, other dicarboxylic acids may also be copolymerized.

Specific examples of the polybasic carboxylic acids other than these dicarboxylic acids include: ethane tricarboxylic acid, propane tricarboxylic acid, butane tetracarboxylic acid, pyromellitic acid, trimellitic acid, trimesic acid, 3,4,3',4'-biphenyl tetracarboxylic acid, and ester-forming derivatives of these.

Specific examples of the glycols include: aliphatic glycols exemplified by ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecanediol, polyethylene glycol, polytrimethylene glycol and polytetramethylene glycol; aromatic glycols exemplified by hydroquinone, 4,4'-dihydroxybisphenol, 1,4-bis(β-hydroxyethoxy)benzene, 1,4-bis(β-hydroxy ethoxy phenyl) sulfone, bis(p-hydroxyphenyl) ether, bis(p-hydroxyphenyl) sulfone, bis(p-hydroxyphenyl)methane, 1,2-bis(p-hydroxyphenyl)ethane, bisphenol A, bisphenol C and 2,5-naphthalenediol; and glycols obtained by adding ethylene oxide to these glycols.

Among the foregoing glycols, it is preferable to use as the main component ethylene glycol, 1,3-propylene glycol, 1,4-butylene glycol or 1,4-cyclohexane dimethanol.

Specific examples of the polyhydric alcohols other than these glycols include: trimethylolmethane, trimethylolethane, trimethylolpropane, pentaerythritol, glycerol and hexanetriol.

Specific examples of the hydroxy carboxylic acids include lactic acid, citric acid, malic acid, tartaric acid, hydroxyacetic acid, 3-hydroxylactic acid, p-hydroxybenzoic acid, p-(2-hydroxyethoxyl)benzoic acid and 4-hydroxy cyclohexane carboxylic acid, or ester-forming derivatives of these.

Specific examples of the cyclic esters include ε-caprolactone, β-propiolactone, β-methyl-β-propiolactone, δ-valerolactone, glycolide and lactide.

Specific examples of the ester-forming derivatives of the polybasic carboxylic acids and hydroxy carboxylic acids include the alkyl esters, acid chlorides and acid anhydrides of these.

Among the foregoing, polyesters including as the main acid component terephthalic acid or an ester-forming derivative thereof, or a naphthalene dicarboxylic acid or an ester-forming derivative thereof, and including as the main glycol component an alkylene glycol are preferable.

The polyester including as the main acid component terephthalic acid or an ester-forming derivative thereof is a polyester including terephthalic acid or the ester-forming derivative thereof in a total amount of preferably 70 mol % or more, more preferably 80 mol % or more and furthermore preferably 90 mol % or more, based on the whole acid components. The polyester including as the main acid component a naphthalene dicarboxylic acid or an ester-forming derivative thereof is a polyester including the naphthalene dicarboxylic acid or the ester-forming derivative thereof in a total amount of preferably 70 mol % or more, more preferably 80 mol % or more and furthermore preferably 90 mol % or more, based on the whole acid components.

Among the foregoing naphthalene dicarboxylic acids or the ester-forming derivative thereof, 1,3-naphthalene dicarboxylic acid, 1,4-naphthalene dicarboxylic acid, 1,5-naphthalene dicarboxylic acid, 2,6-naphthalene dicarboxylic acid and 2,7-naphthalene dicarboxylic acid, being exemplified in the foregoing dicarboxylic acids, or ester-forming derivatives of these are preferable.

The foregoing polyester including as the main glycol component alkylene glycols is a polyester including the alkylene glycols in a total amount of preferably 70 mol % or more, more preferably 80 mol % or more and furthermore preferably 90 mol % or more, based on the whole glycol components. The alkylene glycols as referred to herein may include in the molecule chain thereof a substituent(s) or an alicyclic structure(s).

The copolymerization component other than the terephthalic acid/ethylene glycol is preferably, from the viewpoint of the compatibility between transparency and moldability, at least one or more selected from the group consisting of isophthalic acid, 2,6-naphthalene dicarboxylic acid, diethylene glycol, neopentyl glycol, 1,4-cyclohexane dimethanol, 1,2-propanediol, 1,3-propanediol and 2-methyl-1,3-propanediol, and is more preferably at least one or more selected from the group consisting of isophthalic acid, diethylene glycol, neopentyl glycol and 1,4-cyclohexane dimethanol.

A preferable example of the polyester used in the oxygen-absorbing resin composition of the present embodiment is a polyester in which the main repeating unit is composed of ethylene terephthalate. The polyester is more preferably a linear polyester containing 70 mol % or more of the ethylene-terephthalate unit, furthermore preferably a linear polyester containing 80 mol % or more of the ethylene-terephthalate unit, and particularly preferably a linear polyester containing 90 mol % or more of the ethylene terephthalate unit.

Another preferable example of the polyester used in the oxygen-absorbing resin composition of the present embodiment is a polyester in which the main repeating unit is constituted with ethylene-2,6-naphthalate. The polyester is more preferably a linear polyester containing 70 mol % or more of the thylene-2,6-naphthalate unit, furthermore preferably a linear polyester containing 80 mol % or more of the ethylene-2,6-naphthalate and particularly preferably a linear polyester containing 90 mol % or more of the ethylene-2,6-naphthalate.

Yet another preferable example of the polyester used in the oxygen-absorbing resin composition of the present embodiment is: a linear polyester containing 70 mol % or more of the propylene terephthalate unit; a linear polyester containing 70 mol % or more of the propylene naphthalate unit; a linear polyester containing 70 mol % or more of the 1,4-cyclohexane dimethylene terephthalate unit; a linear polyester containing 70 mol % or more of the butylene naphthalate unit; or a linear polyester containing 70 mol % or more of butylene terephthalate unit.

As the polyester particularly preferable from the viewpoint of the compatibility between transparency and moldability, the combinations of the whole polyester are a combination of terephthalic acid/isophthalic acid/ethylene glycol, a combination of terephthalic acid/ethylene glycol/1,4-cyclohexane dimethanol and a combination of terephthalic acid/ethylene glycol/neopentyl glycol. As a matter of course, the foregoing polyester may include a small amount (5 mol % or less) of diethylene glycol produced by the dimerization of ethylene glycol during the esterification (transesterification) reaction or the polycondensation reaction.

As another preferable example of the polyester used in the oxygen-absorbing resin composition of the present embodiment, polyglycolic acid obtained by the polycondensation of glycolic acid or methyl glycolate, or by ring-opening polycondensation of glycolide is quoted. The polyglycolic acid may be a polyglycolic acid copolymerized with other components such as lactide.

<Polyamide>

Examples of the polyamide used in the oxygen-absorbing resin composition of the present embodiment include: a polyamide including as the main constitutional unit the unit derived from lactam or an amino carboxylic acid; an aliphatic polyamide including as the main constitutional unit the unit derived from an aliphatic diamine and an aliphatic dicarboxylic acid; a partially aromatic polyamide including as the main constitutional unit the unit derived from an aliphatic diamine and an aromatic dicarboxylic acid; and a partially aromatic polyamide including as the main constitutional unit the unit derived from an aromatic diamine and an aliphatic dicarboxylic acid. The polyamide as referred to herein may be a polymer obtained by copolymerizing the monomer units other than the main constitutional unit, if necessary.

Specific examples of the lactam or the amino carboxylic acid include lactams such as ε-caprolactam and laurolactam; amino carboxylic acids such as amino caproic acid and amino undecanoic acid; and aromatic amino carboxylic acids such as p-amino methyl benzoic acid.

Specific examples of the aliphatic diamine include aliphatic diamines having 2 to 12 carbon atoms or functional derivatives thereof, and alicyclic diamines having 2 to 12 carbon atoms. The aliphatic diamine may be a linear aliphatic diamine or a branched chain aliphatic diamine. Specific examples of the linear aliphatic diamine include: aliphatic diamines such as ethylenediamine, 1-methylethylenediamine, 1,3-propylenediamine, tetraethylenediamine, pentamethylenediamine, hexametjhylenediamine, heptamethylenediamine, octamethylenediamine, nonamethylenediamine, decamethylenediamine, undecamethylenediamine and dodecamethylenediamine. Specific examples of the alicyclic diamine include cyclohexanediamine, 1,3-bis(aminomethyl)cyclohexane and 1,4-bis(aminomethyl)cyclohexane.

Specific examples of the aliphatic dicarboxylic acid include linear aliphatic dicarboxylic acids and alicyclic dicarboxylic acids. In particular, linear aliphatic dicarboxylic acid having an alkylene group having 4 to 12 carbon atoms are preferable. Linear aliphatic dicarboxylic acids include: adipic acid, sebacic acid, malonic acid, succinic acid, glutaric acid, pimelic acid, suberic acid, azelaic acid, undecanoic acid, undecanedioic acid, dodecanedioic acid and dimeric acid, and functional derivatives of these. Alicyclic dicarboxylic acids include: 1,4-cyclohexanedicarboxylic acid, hexahydroterephthalic acid and hexahydroisophthalic acid.

Specific examples of the aromatic diamine include metaxylylenediamine, paraxylylenediamine and para-bis(2-aminoethyl)benzene.

Specific examples of the aromatic dicarboxylic acid include terephthalic acid, isophthalic acid, phthalic acid, 2,6-naphthalene dicarboxylic acid, diphenyl-4,4'-dicarboxylic acid and diphenoxyethane dicarboxylic acid, and functional derivatives of these.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, polymethaxylylene adipamide (polyamide MXD6), isophthalic acid copolymerized polymetaxylylene adipamide (polyamide MXD6I), polymetaxylylene sebacamide (polyamide MXD10), polymetaxylylene dodecanamide (polyamide MXD12), poly-1,3-bisaminocyclohexane adipamide (polyamide BAC6) and polyparaxylylene sebacamide (polyamide PXD10). More preferable polyamides include polyamide 6, polyamide MXD6 and polyamide MXD6I.

The copolymerization component which may be copolymerized with the foregoing polyamides including a polyether having at least one terminal amino group or one terminal carboxyl group and having a number average molecular weight of 2000 to 20000, an organic carboxylic acid salt of the polyether having the terminal amino group, and an amino salt of the polyether having the terminal carboxyl group can be used. Specific examples of such a copolymerization component include bis(aminopropyl)poly (ethylene oxide) (polyethylene glycol having a number average molecular weight of 2000 to 20000).

The partially aromatic polyamide may include a constitutional unit derived from a tribasic or higher polybasic carboxylic acid such as trimellitic acid or pyromellitic acid, within a range of substantially being linear.

<Ethylene-Vinyl Alcohol Copolymer>

The ethylene-vinyl alcohol copolymer used in the oxygen-absorbing resin composition of the present embodiment is preferably an ethylene-vinyl alcohol copolymer in which the content of ethylene is 15 to 60 mol % and the degree of saponification of the vinyl acetate component is 90 mol % or more. The content of ethylene is preferably 20 to 55 mol % and more preferably 29 to 44 mol %. The degree of saponification of vinyl acetate is preferably 95 mol % or more. The ethylene-vinyl alcohol copolymer may further include small amounts of comonomers such as α-olefins such as propylene, isobutene, α-octene, α-dodecene and α-octadecene; unsaturated carboxylic acids or the salts thereof; partial alkyl esters; complete alkyl esters; nitriles; amides; anhydrides; and unsaturated sulfonic acids or the salts thereof.

<Plant-Derived Resins>

The plant-derived resin used in the oxygen-absorbing resin composition of the present embodiment is only required to be a resin including as a raw material a plant-derived substance and is not limited with respect to the plant to be the raw material of the resin. Specific examples of the plant-derived resin include an aliphatic polyester-based biodegradable resin. Examples of the aliphatic polyester-based biodegradable resin include: poly(α-hydroxy acids) such as polyglycolic acid (PGA) and polylactic acid (PLA); and polyalkylene alkanoates such as polybutylene succinate (PBS) and polyethylene succinate (PES).

<Chlorine-Based Resins>

The chlorine-based resin used in the oxygen-absorbing resin composition of the present embodiment is only required to be a resin including chlorine in the constitutional unit thereof, and heretofore known such resins can be used. Specific examples of the chlorine-based resin include: polyvinyl chloride, polyvinylidene chloride and copolymers of these with vinyl acetate, maleic acid derivatives and higher alkyl vinyl ethers.

Among the thermoplastic resins presented as examples, linear low density polyethylene (LLDPE), ethylene-vinyl alcohol copolymer (EVOH), nylon 6 (PA6), polyethylene terephthalate (PET) and polyvinyl chloride (PVC) preferably used as food packaging materials.

<Various Additives>

The oxygen-absorbing resin composition of the present embodiment may include, in addition to the foregoing components, various additives heretofore known in the art, within the range not excessively impairing the advantageous effects of the present embodiment. Examples of such optional additives include, without being particularly limited to: additives such as drying agents, pigments such as titanium oxide, dyes, antioxidants, slipping agents, antistatic agents and stabilizers; fillers such as calcium carbonate, clay, mica and silica; and deodorants.

Additionally, the oxygen-absorbing resin composition of the present embodiment may further include, if necessary, a radical generating agent or a photoinitiator in order to promote the oxygen absorption reaction. Specific examples of the radical generating agent include, without being particularly limited to: various N-hydroxyimide compounds, such as N-hydroxysuccinimide, N-hydroxymaleimide, N,N'-dihydroxy-cyclohexane-tetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy het acid imide, N-hydroxy hymic acid imide, N-hydroxy trimellitic acid imide and N,N-dihydroxy pyromellitic acid diimide. Specific examples of the photoinitiator include, without being particularly limited to: benzophenone and derivatives thereof, thiazine dyes, metal porphyrin derivatives and anthraquinone derivatives. These radical generating agents and photoinitiators can be used each alone or in combinations of two or more thereof.

The indane ring-containing copolymerized polyolefin compound and the transition metal catalyst, and the thermoplastic resin and the various additives included according to need can be mixed with each other by a heretofore known method. By kneading these with an extruder, an oxygen-absorbing resin composition having a higher dispersiveness can also be obtained.

The oxygen-absorbing resin composition of the present embodiment can be used, needless to say, in a single layer form as packaging materials and packaging vessels, and can also be used in a laminate form including at least a layer formed of the oxygen-absorbing resin composition and a layer formed of another resin as oxygen-absorbing multilayer packaging materials and oxygen-absorbing multilayer packaging vessels. In general, the oxygen-absorbing resin composition of the present embodiment is preferably disposed on the inside of a vessel or the like rather than on the outside surface so as not to be exposed on the outside surface of the vessel or the like, or alternatively, is preferably disposed on the outside of a vessel or the like rather than on the inside surface of the vessel or the like for the purpose of avoiding direct contact with the content. As described above, it is preferable to use the oxygen-absorbing resin composition at least as an intermediate layer of multiple layers.

The oxygen-absorbing resin composition of the present embodiment can also be used, in a form of a film or a sheet, as an oxygen-absorbing multilayer body having at least a sealant layer including a polyolefin resin, an oxygen-absorbing layer including the oxygen-absorbing resin composition and a gas barrier layer including a gas barrier substance. The obtained oxygen-absorbing multilayer body can also be used as an oxygen-absorbing paper vessel by further laminating a paper base material on the outer layer of the gas barrier layer.

As the gas barrier substance used in the gas barrier layer of the present embodiment, a gas barrier thermoplastic resin, a gas barrier thermosetting resin, various vapor deposited films of silica, alumina, aluminum, and metal foils such as aluminum foil can be used. Examples of the gas barrier thermoplastic resin include, without being particularly limited to: ethylene-vinyl alcohol copolymer, MXD6 and polyvinylidene chloride. Examples of the gas barrier thermosetting resin include, without being particularly limited to: a gas barrier epoxy resin (for example, "Maxive," trade name, manufactured by Mitsubishi Gas Chemical Company, Inc.).

For the method for producing an oxygen-absorbing multilayer body, according to the properties of each of the materials, the purpose of the processing, the steps of the processing, heretofore known methods such as a coextrusion method, various laminating methods and various coating methods can be used. When the oxygen-absorbing multilayer body is molded into a film or sheet shape, examples of the production method include: a method in which a molten resin composition is extruded through a T-die, a circular die or the like from an extruder to produce a film or a sheet; and a method in which an adhesive is applied to an oxygen-absorbing film or sheet, and the oxygen-absorbing film or sheet is bonded to another film or sheet to produce a film or sheet. Alternatively, a multilayer vessel having a predetermined shape or a preform for production of a vessel can be formed by coinjecting or successively injecting molten resins through a multilayer multiple die into an injection mold by using an injection machine. From the preform, a stretched blow bottle can be produced by heating the preform at a stretching temperature, stretching the heated preform in an axial direction and at the same time stretching the heated preform in the circumferential direction by a fluid pressure.

The oxygen-absorbing multilayer body can be used by molding into a film shape, and by processing the resulting film into a bag shape or a lid member. By molding into a sheet shape and applying a molding method such as vacuum molding, compressed-air molding or plug-assist molding, the oxygen-absorbing multilayer body of the present embodiment can also be heat molded into an oxygen-absorbing multilayer vessel having a predetermined shape such as a tray, a cup, a bottle or a tube. To the obtained bag-shaped vessel and cup-shaped vessel, a boil disinfection treatment at 80 to 100° C., a semi-retorting disinfection treatment at 100 to 135° C., a retorting disinfection treatment, and a high-retorting disinfection treatment can be applied. In addition, the oxygen-absorbing multilayer body of the present embodiment can also be preferably used as a pouch provided with an opening allowing water vapor to pass easily therethrough, so as to cope with microwave cooking, in such a way that a content such as a food product is packed in a bag-shaped vessel formed of the oxygen-absorbing multilayer body, serving as a pouch, and an opening is provided in the vessel so as for water vapor to be discharged from the opening at the time of microwave cooking.

The oxygen-absorbing resin composition of the present embodiment can also be used as a small bag-shaped oxygen-absorbing agent package in such a way that the oxygen-absorbing resin composition of the present embodiment is processed into a powdery material, a granular material, a pellet type material or any other small piece type material, and the resulting material is filled in an air permeable packaging material. The air permeable packaging material is not particularly limited as long as the air permeable packaging material can be used in application to oxygen-absorbing agents; however, for the purpose of achieving sufficient oxygen absorption effect, it is preferable to use a packaging material having an air permeability as high as possible. Examples of such a packaging material include: papers such as Japanese paper, Western paper and rayon paper; nonwoven fabrics using various fibers obtained from pulp, cellulose and synthesis resins; plastic films or perforated products thereof; or microporous films obtained by stretching after the addition of calcium carbonate or the like; and in addition, products obtained by laminating two or more selected from these. Examples of the plastic film include: a laminated film obtained by laminating on and bonding to each other a film of polyethylene terephthalate, polyamide, polypropylene or polycarbonate and a film, as a seal layer, of polyethylene, ionomer, polybutadiene, ethylene-acrylic acid copolymer, ethylene-methacrylic acid copolymer or ethylene-vinyl acetate copolymer.

An oxygen-absorbing vessel can be formed by incorporating the oxygen-absorbing resin composition or the oxygen-absorbing multilayer body of the present embodiment into the whole or a part of the packaging vessel. The oxygen-absorbing vessel of the present embodiment absorbs the oxygen in the vessel, also absorbs the oxygen permeating or penetrating through the vessel wall from outside the vessel when even a small amount of oxygen permeates or penetrates through the vessel wall, and accordingly can prevent the deterioration of the contained matter to be stored (the object to be stored) due to oxygen.

The shape of the oxygen-absorbing vessel of the present embodiment is not particularly limited, and can be appropriately determined according to the object to be housed or stored. Such a vessel can be suitably used as, for example, a pouch, a cup, a tray and a bottle.

Additionally, for example, by forming a bag from the film-shaped or sheet-shaped oxygen-absorbing resin composition or oxygen-absorbing multilayer body, the oxygen-absorbing resin composition or the oxygen-absorbing multilayer body can be used as, for example, a three side seal flat bag, a standing pouch, a gazette packaging bag, a pillow packaging bag, a multi-compartment pouch composed of a main compartment and subcompartments with an easily releasable wall between the main compartment and each of the subcompartments, and a shrinkable film package. Vessels having optional shapes can also be made from the oxygen-absorbing resin composition and the oxygen-absorbing multilayer body by applying heat molding to these composition and laminate.

More specifically, by molding the film-shaped or sheet-shaped oxygen-absorbing resin composition or oxygen-absorbing multilayer body with a method such as vacuum molding, compressed-air molding or plug-assist molding, oxygen-absorbing vessels each having a predetermined shape such as a tray, a cup, a bottle, a tube and a PTP (press-through-pack) can be prepared. A multilayer vessel having a predetermined shape can also be formed in one step by coinfecting or successively injecting molten resins through a multilayer multiple die into an injection mold by using an injection machine.

When a heat molded vessel having a flange portion is prepared, a special processing to impart easy release function to the flange portion may be applied to the flange portion. The use of the oxygen-absorbing resin composition or the oxygen-absorbing multilayer body as the members such as the lid member or the top seal member of a vessel allows the vessel to be imparted with oxygen absorption function.

By molding the oxygen-absorbing resin composition or the oxygen-absorbing multilayer body of the present embodiment into film shape or sheet shape, the composition or the laminate can also be used as oxygen-absorbing agents in the forms such as labels, cards and packings.

When the oxygen-absorbing resin composition or the oxygen-absorbing multilayer body of the present embodiment is used, irradiation with an energy ray enables the promotion of the start of the oxygen absorption reaction or the increase of the oxygen absorption rate. As the energy ray, for example, visible ray, ultraviolet ray, X-ray, electron beam and γ-ray can be used. The irradiation energy amount can be appropriately selected according to the type of the energy ray used.

The oxygen-absorbing resin composition of the present embodiment does not need moisture as an essential component for oxygen absorption, in other words can absorb oxygen irrespective as to whether or not the object to be stored has moisture, and hence can be used in a wide range of applications irrespective of the type of the object to be stored. In particular, the oxygen-absorbing resin composition of the present embodiment is free from the generation of odor after oxygen absorption, and hence can be particularly suitably used, for example, for food, prepared food, beverages, health food and pharmaceuticals. In other words, the oxygen-absorbing resin composition of the present embodiment and various molded articles such as laminates using the composition are excellent in oxygen absorption performance over a wide range of humidity conditions from a low humidity to a high humidity (relative humidity: 0 to 100%) and are excellent in the flavor retention property, and hence are suitable for packaging various articles.

Specific examples of the object to be stored may include, without being particularly limited to: beverages such as milk, juice, coffee, teas and alcoholic drinks; liquid seasonings such as sauce, soy sauce, noodle dipping sauce and dressings; prepared foods such as soup, stew and curry; paste-like foods such as jam and mayonnaise; fishery products such as tuna, fish and shellfish; dairy processed products and egg processed products such as cheese, butter and eggs; processed meat products such as meat, salami, sausage and ham; vegetables such as carrot, potato, asparagus and shiitake mushroom; fruits; eggs; noodles; rice such as rice or polished rice; grains such as such as beans; rice processed foods or grain processed foods such as cooked rice, glutinous rice boiled with red beans, rice cakes and rice gruel; confectioneries such as bars of sweet jellied adzuki-bean paste, puddings, cakes and buns with bean jam filling; dried foods (foods low in water activity) such as powdered seasoning, ground coffee, coffee beans, tea, powder milk for babies, prepared foods for babies, diet powder foods, prepared care foods, dried vegetables, fried rice cakes and rice crackers; chemicals such as adhesives, pressure-sensitive adhesives, agricultural chemicals and insecticides; pharmaceuticals; health food such as vitamin preparations; pet food; miscellaneous goods such as cosmetics, shampoos, rinses and detergents; and other various articles. In particular, the oxygen-absorbing resin composition of the present embodiment is suitable for the packaging materials for the objects tending to be deteriorated in the presence of oxygen such as: beverages such as beer, wine, sake (Japanese rice wine), shochu (Japanese distilled spirit), fruit juice beverages, fruit juices, vegetable juices, carbonated soft drinks and teas; foods such as fruits, nuts, vegetables, meat products, infant food, coffee, jam, mayonnaise, ketchup, edible oil, dressing, sauces, preservable foods boiled down in soy sauce and dairy products; and other objects to be stored such as pharmaceuticals and cosmetics. The water activity is a measure indicating the content of free water in an article, and is represented by a numerical value of 0 to 1; the water activity of an article free from moisture is 0 and the water activity of pure water is 1. Specifically, the water activity Aw of an article is defined by the following formula when the article is sealed in a space, the water vapor pressure in the space after the equilibrium state is reached is represented by P, the vapor pressure of pure water is represented by P0, and the relative humidity in the space is represented by RH (%):

$$Aw=P/P0=RH/100$$

Before or after the packing (packaging) of the object to be stored, the disinfection treatment of the vessel or the object to be stored can be performed in a manner suitable for the object to be stored. Examples of the disinfection method include: heat disinfections such as a hot water treatment at 100° C. or lower, a pressurized hot water treatment at 100° C. or higher, and an ultra-high-temperature heat treatment at 130° C. or higher; electromagnetic wave disinfections with electromagnetic waves such as, ultraviolet ray, microwave and γ-ray; treatments with gases such as ethylene oxide; and disinfections with chemicals such as hydrogen peroxide and hypochlorous acid.

EXAMPLES

The present invention is described in more detail, with reference to Examples and Comparative Examples presented below, but the present invention is not limited at all by following Examples.

The measurements of the amount of oxygen absorbed, and the evaluations of the exterior appearance and odor were performed as follows.

(1) Measurement of Amount of Oxygen Absorbed

Two pieces of a film were packed respectively, together with 500 cc of air, in two gas barrier bags each formed of an aluminum foil laminate film, wherein the relative humidities in the bags were 100% and 30%, respectively; the two bags were sealed after packing, and stored at 23° C.; then, the total amount of oxygen absorbed in three days after the sealing in each of the bags was measured.

(2) Exterior Appearance

The exterior appearance of a film after a storage at 40° C. and a relative humidity of 100% for 1 month was visually verified.

(3) Evaluation of Odor

In the same manner as in the measurement of the oxygen absorption amount, a sealed bag stored at a temperature of 23° C. and a relative humidity of 100% or 30% was opened, and the odor in the sealed bag was verified.

The occurrence or nonoccurrence of the change of the odor before and after the oxygen absorption were evaluated, and the case where no change of the odor was found after the oxygen absorption was determined to be the case of "no generation of the odor."

Synthesis Example

In a four-necked separable flask having an internal volume of 1000 mL, 100 g of an ethylene-methyl methacrylate copolymer ("Acryft WK402," trade name, MMA content: 25% by weight, manufactured by Sumitomo Chemical Co., Ltd.), 84 g of 2-hydroxyhydrindene, 150 g of decalin and 0.2 g of tetrabutyl titanate as a transesterification catalyst were charged; the resulting reaction solution was increased in temperature to 210° C. under stirring in a nitrogen atmosphere, and was allowed to react for 3 hours while methanol was being distilled off. After the completion of the distillation off of methanol, the pressure of the reaction system was gradually reduced and decalin was distilled off. Subsequently, the obtained crude reaction product was dissolved in toluene heated to 80° C. so as for the concentration to be 3 to 4% by weight, then the resulting solution was cooled to about 40° C., methanol was added to the solution, and the reprecipitated indane ring-containing copolymerized polyolefin compound was collected by filtration. The analysis results of the copolymerized polyolefin compound by NMR are as follows:

$^1$H-NMR (400 MHz CDCl$_3$) 2-hydroxyhydrindene region: δ 7.16-7.22 (4H m), 5.49-5.51 (1H m), 2.94-2.98 (2H dd), 3.28-3.33 (2H dd), methyl methacrylate region: δ 3.65 (3H s)

The weight average molecular weight and the number average molecular weight of the obtained copolymerized polyolefin compound were measured by GPC (gel permeation chromatography), and the weight average molecular weight was found to be 1.1×10$^5$, and the number average molecular weight was found to be 3.7×10$^4$. The melting point of the obtained copolymerized polyolefin compound was measured by DSC, and was found to be 72° C.

Example 1

Cobalt stearate was dry blended with the copolymerized polyolefin compound in an amount of 0.1 part by mass based on 100 parts by mass of the copolymerized polyolefin compound. From the resulting blend, an oxygen-absorbing film of 130 mm in width and 90 to 100 μm in thickness was prepared with a twin screw extruder having two screws of 20 mm in diameter, under the conditions of an extrusion temperature of 220° C., a screw rotation number of 60 rpm, a feed screw rotation number of 16 rpm, and a taking-up speed of 1.0 m/min. From the obtained film, a 100 mm×100 mm film was prepared, and was used for the evaluations of the amount of oxygen absorbed, the exterior appearance and the odor. The results thus obtained are shown in Table 1.

Example 2

A film was prepared in the same manner as in Example 1 except that cobalt stearate was replaced with iron stearate, and was used for the evaluations of the amount of oxygen absorbed, the exterior appearance and the odor. The results thus obtained are shown in Table 1.

Comparative Examples 1

A film was prepared in the same manner as in Example 1 except that the copolymerized polyolefin compound was replaced with N-MXD6 (trade name "MX nylon S6011," manufactured by Mitsubishi Gas Chemical Company, Inc.), and was used for the evaluations of the amount of oxygen absorbed, the exterior appearance and the odor. The results thus obtained are shown in Table 1.

As can be seen from Examples 1 and 2, the oxygen-absorbing resin composition of the present embodiment was free from the odor generation after oxygen absorption, and exhibited an excellent oxygen absorption performance at either a high humidity or a low humidity. The oxygen-absorbing resin composition of the present embodiment retained the shape of the film formed therefrom without undergoing collapse.

The invention claimed is:

1. An oxygen-absorbing resin composition comprising a copolymerized compound and a transition metal catalyst, wherein the copolymerized compound is a copolymerized compound comprising:

at least one of constitutional unit (a) selected from the group consisting of the constitutional units represented by the following general formula (1):

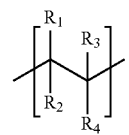

wherein $R_1$, $R_2$, $R_3$ and $R_4$ each independently represent a hydrogen atom or a first monovalent substituent, the first monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group, and these groups may further have a substituent; and at least one of constitutional unit (b) having an indane ring, selected from the group consisting of the constitutional units represented by the following general formulas (2) and (3):

TABLE 1

| | Resin compound | Transition metal catalyst | Amount of oxygen absorbed[1] | | Exterior appearance[2] | Odor generation | |
| | | | Humidity 100% | Humidity 30% | | Humidity 100% | Humidity 30% |
| --- | --- | --- | --- | --- | --- | --- | --- |
| Example 1 | Copolymerized polyolefin | Cobalt stearate | 14 cc | 20 cc | Shape retained | None | None |
| Example 2 | Copolymerized polyolefin | Iron stearate | 10 cc | 14 cc | Shape retained | None | None |
| Comparative Example 1 | N-MXD6 | Cobalt stearate | 3 cc | 0 cc | Collapsed | None | None |

1) Total amount of oxygen absorbed in 7 days from the start of the test.
2) Evaluated after the storage at 40° C. and a humidity of 100% for 1 month.

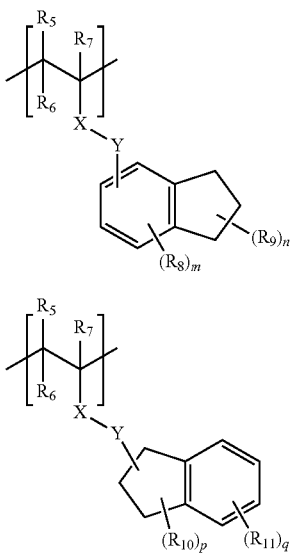

(2)

(3)

wherein $R_5$, $R_6$ and $R_7$ each independently represent a hydrogen atom or a second monovalent substituent, $R_8$, $R_9$, $R_{10}$ and $R_{11}$ each independently represent a third monovalent substituent, the second monovalent substituent and the third monovalent substituent are each independently at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a mercapto group, an alkylthio group, an arylthio group, a heterocyclic thio group and an imide group, the groups may further have a substituent, and when the number of $R_8$s, $R_9$s, $R_{10}$s or $R_{11}$s being present is two or more, the two or more $R_8$s, $R_9$s, $R_{10}$s or $R_{11}$s may be the same as each other or different from each other; m represents an integer of 0 to 3, n represents an integer of 0 to 5, q represents an integer of 0 to 4 and q represent an integer of 0 to 4, and at least one hydrogen atom is bonded to a benzylic position of the indane ring; X represents a divalent group selected from the group consisting of —(C=O)O—, —(C=O)NH—, —O(C=O)—, —NH(C=O)— and —(CHR)s-, and s represents an integer of 0 to 12; Y is —(CHR)t-, and t represents an integer of 0 to 12; and R represents a monovalent chemical species selected from the group consisting of a hydrogen atom, a methyl group and an ethyl group.

2. The oxygen-absorbing resin composition according to claim 1, wherein the transition metal catalyst comprises at least one transition metal selected from the group consisting of manganese, iron, cobalt, nickel and copper.

3. The oxygen-absorbing resin composition according to claim 1, wherein the transition metal catalyst is included in an amount of 0.001 to 10 parts by mass in terms of the transition metal amount, based on 100 parts by mass of the copolymerized compound.

4. The oxygen-absorbing resin composition according to claim 1, wherein a content ratio of a content of the constitutional unit (a) to a content of the constitutional unit (b) is 1/99 to 99/1 in terms of the molar ratio.

5. The oxygen-absorbing resin composition according to claim 1,
wherein the constitutional unit (a) is at least one selected from the group consisting of the constitutional units represented by the following general formulas (4) and (5):

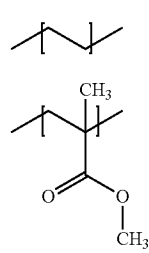

(4)

(5)

and the constitutional unit (b) is the constitutional unit represented by the following general formula (6):

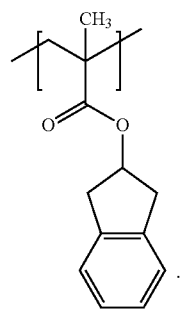

(6)

* * * * *

UNITED STATES PATENT AND TRADEMARK OFFICE
CERTIFICATE OF CORRECTION

PATENT NO. : 9,630,764 B2
APPLICATION NO. : 14/412809
DATED : April 25, 2017
INVENTOR(S) : S. Iwamoto et al.

Page 1 of 1

It is certified that error appears in the above-identified patent and that said Letters Patent is hereby corrected as shown below:

In the Claims

At Column 27, Line 42 (Claim 1, Line 40), please change "5, q" to -- 5, p --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*